(12) United States Patent
Castro et al.

(10) Patent No.: US 11,644,626 B2
(45) Date of Patent: May 9, 2023

(54) FIBER OPTIC INSPECTION TOOL WITH INTEGRATED CLEANING MECHANISM

(71) Applicant: Panduit Corp., Tinley Park, IL (US)

(72) Inventors: Jose M. Castro, Naperville, IL (US); Thomas M. Sedor, Orland Park, IL (US); Yu Huang, Orland Park, IL (US); Steven M. Bytnar, Chicago, IL (US); Surendra Chitti Babu, Naperville, IL (US); Andrew R. Matcha, Chicago, IL (US)

(73) Assignee: Panduit Corp., Tinley Park, IL (US)

( * ) Notice: Subject to any disclaimer, the term of this patent is extended or adjusted under 35 U.S.C. 154(b) by 326 days.

(21) Appl. No.: 17/026,591

(22) Filed: Sep. 21, 2020

(65) Prior Publication Data

US 2021/0096305 A1    Apr. 1, 2021

Related U.S. Application Data

(60) Provisional application No. 62/907,742, filed on Sep. 30, 2019.

(51) Int. Cl.
G02B 6/38    (2006.01)

(52) U.S. Cl.
CPC .......... *G02B 6/3866* (2013.01); *G02B 6/3898* (2013.01)

(58) Field of Classification Search
None
See application file for complete search history.

(56) References Cited

U.S. PATENT DOCUMENTS

| | | | |
|---|---|---|---|
| 5,179,419 A | 1/1993 | Palmquist et al. |
| 5,809,162 A | 9/1998 | Csipkes et al. |
| 5,836,031 A | 11/1998 | Cox |
| 5,862,250 A | 1/1999 | Csipkes et al. |
| 5,898,494 A | 4/1999 | Csipkes |
| 5,956,793 A | 9/1999 | Cox |
| 5,995,212 A | 11/1999 | Dar et al. |
| 6,209,162 B1 | 4/2001 | Clairadin et al. |
| 6,209,163 B1 | 4/2001 | Clairadin et al. |
| 6,466,310 B2 | 10/2002 | Nguyen et al. |
| 6,648,980 B2 | 11/2003 | Childers et al. |
| 6,758,605 B1 | 7/2004 | Villemaire et al. |
| 6,760,534 B1 | 7/2004 | Son |
| 6,831,738 B2 | 12/2004 | Rogers et al. |

(Continued)

FOREIGN PATENT DOCUMENTS

| | | |
|---|---|---|
| EP | 3482244 A1 | 5/2019 |
| JP | 9197182 A | 7/1997 |

(Continued)

*Primary Examiner* — Jerry Rahll
(74) *Attorney, Agent, or Firm* — Christopher S. Clancy; James H. Williams; Peter S. Lee

(57) ABSTRACT

Various implementations of fiber optic inspection tools with integrated cleaning mechanisms are disclosed. The fiber optic inspection and cleaning tool includes a housing, a cleaning system and an imaging system. The cleaning system includes a pay-off reel, a take-up reel, a spindle and a cleaning tape that travels off the pay-off reel, around the spindle, and onto the take-up reel. The imaging system includes a camera and a light source. The camera, spindle, and cleaning tape are aligned along a visual axis. The pay-off reel, take-up reel, camera and light source are all located within the housing.

19 Claims, 18 Drawing Sheets

(56) References Cited

U.S. PATENT DOCUMENTS

| | | |
|---|---|---|
| 6,854,152 B2 | 2/2005 | Shoemaker et al. |
| 6,989,895 B2 | 1/2006 | Buzzetti |
| 7,042,562 B2 | 5/2006 | Kiani et al. |
| 7,216,393 B2 | 5/2007 | Sato et al. |
| 7,243,390 B2 * | 7/2007 | Fujiwara ............. B08B 1/008 15/210.1 |
| 7,356,236 B1 | 4/2008 | Huang et al. |
| 7,837,801 B2 | 11/2010 | Christopher et al. |
| 8,893,346 B2 | 11/2014 | Murakami et al. |
| 8,988,670 B2 | 3/2015 | Zhou et al. |
| 9,151,694 B2 | 10/2015 | Wilson et al. |
| 9,217,688 B2 | 12/2015 | Levin et al. |
| 9,417,444 B2 | 8/2016 | Huang et al. |
| 9,433,978 B2 | 9/2016 | Huang |
| 9,459,413 B2 | 10/2016 | Kida |
| 9,528,908 B2 | 12/2016 | Wilson et al. |
| 9,753,231 B2 | 9/2017 | Miura et al. |
| 9,821,347 B2 | 11/2017 | Nakane |
| 9,851,557 B2 | 12/2017 | Michaloski et al. |
| 9,958,619 B2 | 5/2018 | Kamouchi et al. |
| 10,006,831 B2 | 6/2018 | Higuchi et al. |
| 10,254,487 B2 | 4/2019 | Huang et al. |
| 2003/0126707 A1* | 7/2003 | Sato ................. G02B 6/3866 15/210.1 |
| 2003/0221706 A1* | 12/2003 | Kiani ................ B08B 1/00 134/21 |
| 2004/0103491 A1* | 6/2004 | Fujiwara ............ B08B 11/00 15/210.1 |
| 2008/0000037 A1* | 1/2008 | Christopher ......... G02B 6/3866 15/210.1 |
| 2013/0185883 A1* | 7/2013 | Murakami ............ A47L 1/15 15/209.1 |
| 2013/0229650 A1* | 9/2013 | Wilson .............. G02B 6/385 356/73.1 |
| 2014/0123415 A1* | 5/2014 | Kanayama ........... B65H 71/00 15/97.1 |
| 2014/0144468 A1* | 5/2014 | Nakane .............. B65H 37/007 15/210.1 |
| 2014/0259477 A1* | 9/2014 | Huang .............. G02B 6/3866 15/97.1 |
| 2014/0259480 A1* | 9/2014 | Kida ............... G02B 6/381 15/101 |
| 2014/0268114 A1* | 9/2014 | Zhou ............... B08B 1/00 356/73.1 |
| 2015/0253516 A1* | 9/2015 | Miura .............. G02B 6/3866 15/105 |
| 2016/0041345 A1* | 2/2016 | Kamouchi .......... G02B 6/3866 15/97.1 |
| 2016/0269106 A1 | 9/2016 | Adam et al. |
| 2016/0313211 A1* | 10/2016 | Higuchi ............ G01M 11/31 |
| 2021/0096039 A1* | 4/2021 | Huang .............. G01M 11/31 |

FOREIGN PATENT DOCUMENTS

| | | |
|---|---|---|
| JP | 03191901 B2 | 7/2001 |
| JP | 2004219602 A | 8/2004 |
| JP | 2008224746 A | 9/2008 |
| JP | 2015010850 A | 1/2015 |
| WO | 2018009802 A1 | 1/2018 |

* cited by examiner

FIBER OPTIC INSPECTION TOOL WITH INTEGRATED CLEANING MECHANISM

CROSS-REFERENCE TO RELATED APPLICATION(S)

This application claims benefit to U.S. Provisional Patent Application No. 62/907,742, filed on Sep. 30, 2019, the entirety of which is hereby incorporated by reference herein.

BACKGROUND

Proper end-face cleaning may be implemented during a fiber optic installation. Fiber optic signal paths are sensitive to dust, oil, and other contaminants on the mating face of a fiber optic connector. Thus, avoiding contamination of a connector end-face is a goal during fiber optic installation and operation. So during network installation steps are often made to inspect and clean the connector end-face prior to connection, where visual inspection and cleaning are performed separately by an installer. Visual inspection and cleaning of connector end-faces may be accomplished faster if a hand-held device existed in the market that allowed installers to inspect and then clean the end-faces of fiber optic connectors without having to disconnect the connector from the hand-held device.

SUMMARY

The present disclosure provides for fiber optic inspection tools having an integrated cleaning mechanism. An exemplary fiber optic end-face inspection and cleaning apparatus includes a housing, a cleaning system, and an imaging system. The cleaning system includes a pay-off reel, a take-up reel, a spindle and a cleaning tape that travels off the pay-off reel, around the spindle, and onto the take-up reel. The imaging system includes a camera and a light source. The camera, spindle, and cleaning tape are aligned along a visual axis. The pay-off reel, take-up reel, camera and light source are all located within the housing.

BRIEF DESCRIPTION OF THE DRAWINGS

The following detailed description references the drawings, wherein.

DETAILED DESCRIPTION

Figure 1:
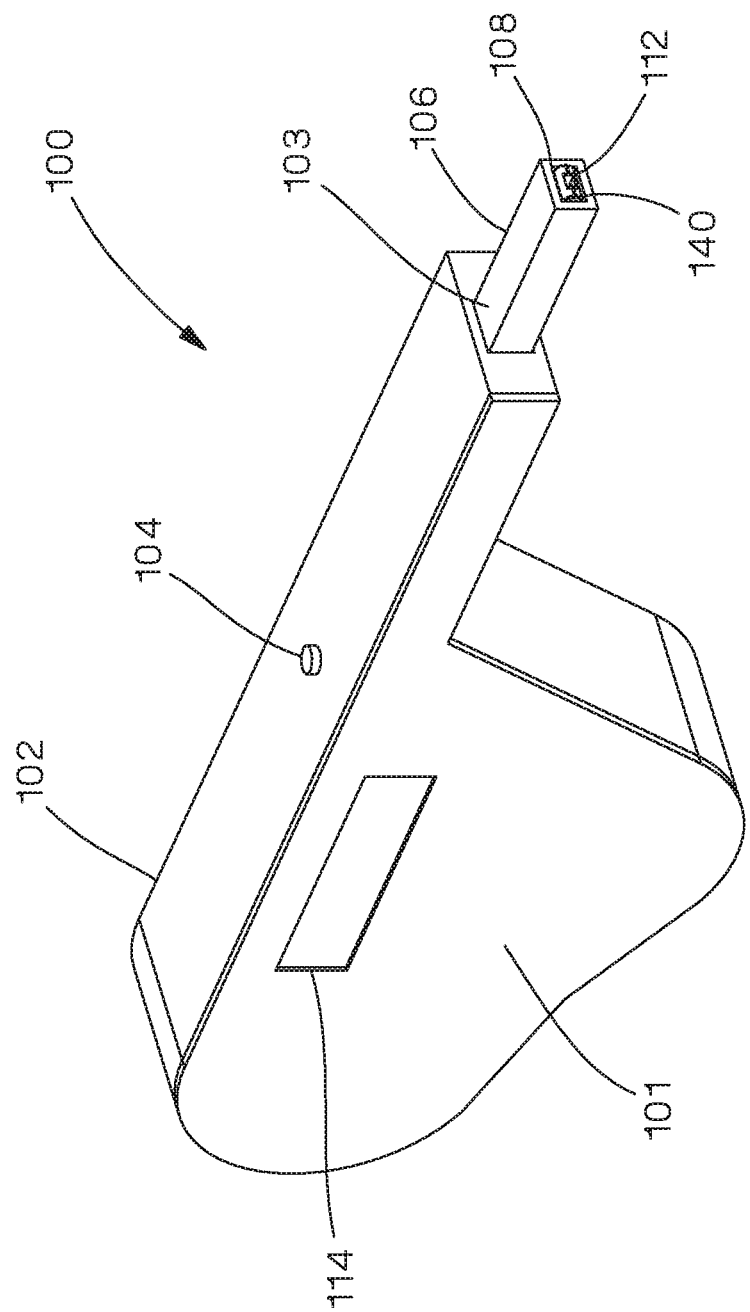
FIG. 1 is a perspective view of a fiber optic inspection and cleaning tool, according to an embodiment of the present disclosure.

The present disclosure relates to the field of optical network interconnection and optical assemblies and, more specifically, to apparatuses and methods to protect and maintain the cleanliness of optical fiber connector end-faces while optimizing network installation.

Fiber optic connector end-faces should be cleaned prior to installation. Due to a combination of factors, such as lack of training or experience of installers, faulty inspection procedures, and/or simply the pressure to meet schedule deadlines connector end faces may still be contaminated during installation. This has made connector contamination a cause of link failures, deployment delays, and excess cost.

The need to meet tight schedules has only exacerbated the issues. Using separate tools for inspection and cleaning wastes additional time. A device that can do both cleaning and inspecting without disconnecting or realigning the connector being inspected, and where the operation can be repeated until the required degree of cleanliness can be achieved, is unavailable in the market. There is a need for such a device, which can enable a more reliable installation of optical interconnects in data centers while reducing time and cost.

These and other objects, features, and advantages of the present disclosure will become apparent to those having ordinary skill in the art upon reading this disclosure.

Reference will now be made to the accompanying drawings. Wherever possible, the same reference numbers are used in the drawings and the following description to refer to the same or similar parts. It is to be expressly understood, however, that the drawings are for illustration and description purposes only. While several examples are described in this document, modifications, adaptations, and other implementations are possible and within the scope of the disclosed embodiments. The proper scope of the disclosed examples may be defined by the appended claims.

FIGS. 1-11 disclose an exemplary fiber optic inspection and cleaning tool 100 according to an embodiment of the present disclosure. The fiber optic inspection and cleaning tool 100 is configured to clean and inspect adapters 402, or an end-face 401 to a connector 400 that is behind such adapter 402, such as those in optical cassettes used in data centers or network patch panels.

The fiber optic inspection and cleaning tool 100 includes a housing 102, a left side cover 101, an indicator 104, a probe 106, a first aperture 108, a cleaning tape 140 surrounding a spindle 110 (seen in FIG. 2), a second aperture 112, and a third aperture 103. Optionally, the left side cover 101 includes a window 114, made from a transparent material such as glass or transparent polymer, to see the internal components and mechanisms of the fiber optic inspection and cleaning tool 100. The fiber optic inspection and cleaning tool 100 may also optionally include a communication device for communicating with other devices wirelessly.

The housing 102 of the fiber optic inspection and cleaning tool 100 may be shaped and sized to be held in the hand of an installer. The probe 106 extends out from the third aperture 103, which is an opening in the housing 102. The first aperture 108 is an opening within the probe 106. The first aperture exposes a spindle 110 and a cleaning tape 140 to the connector end-face 401 or adapter 402 that is positioned to be imaged and/or cleaned by the fiber optic inspection and cleaning tool 100. The second aperture 112 is an opening within the spindle 110.

Figure 2:
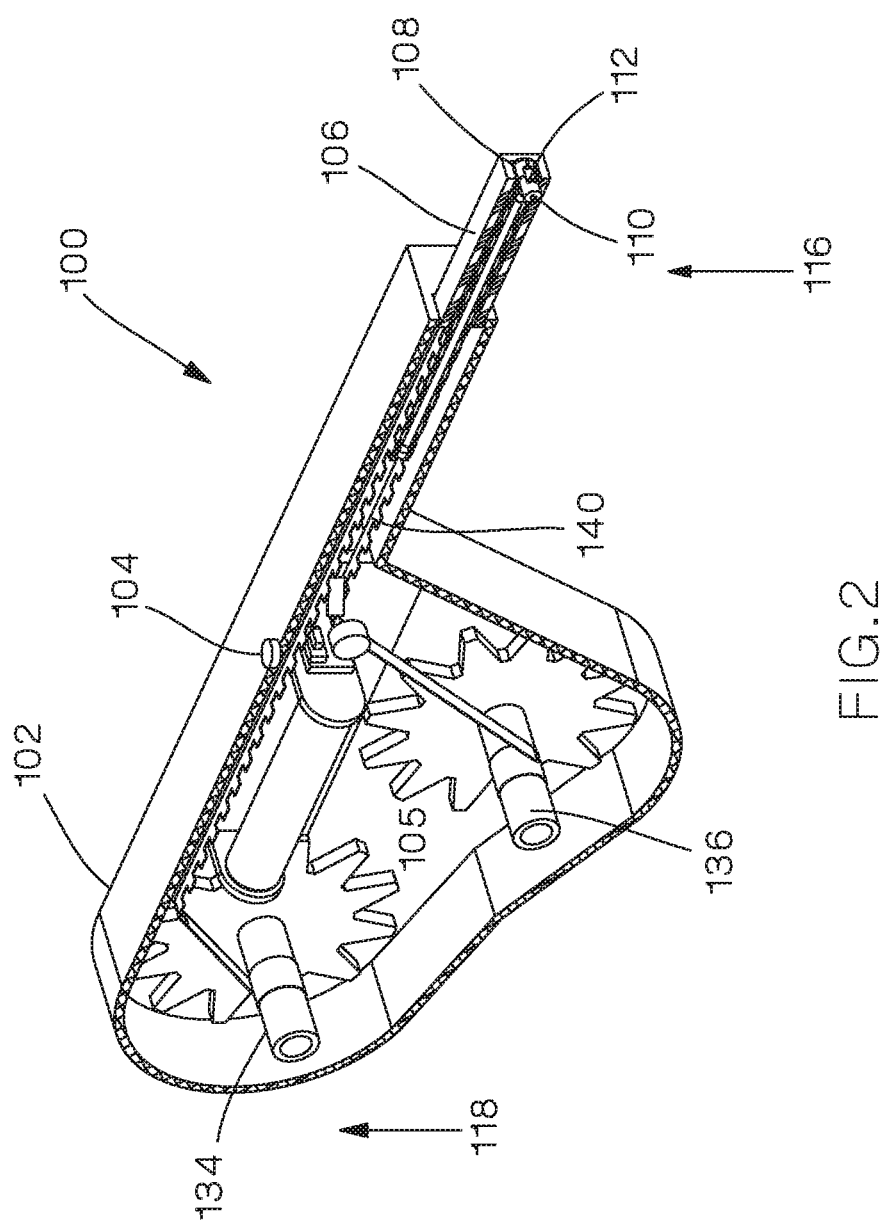
FIG. 2 is a perspective view of the fiber optic inspection and cleaning tool shown in FIG. 1 having a side cover removed to show at least some internal components included in the fiber optic inspection and cleaning tool.
Figure 3:
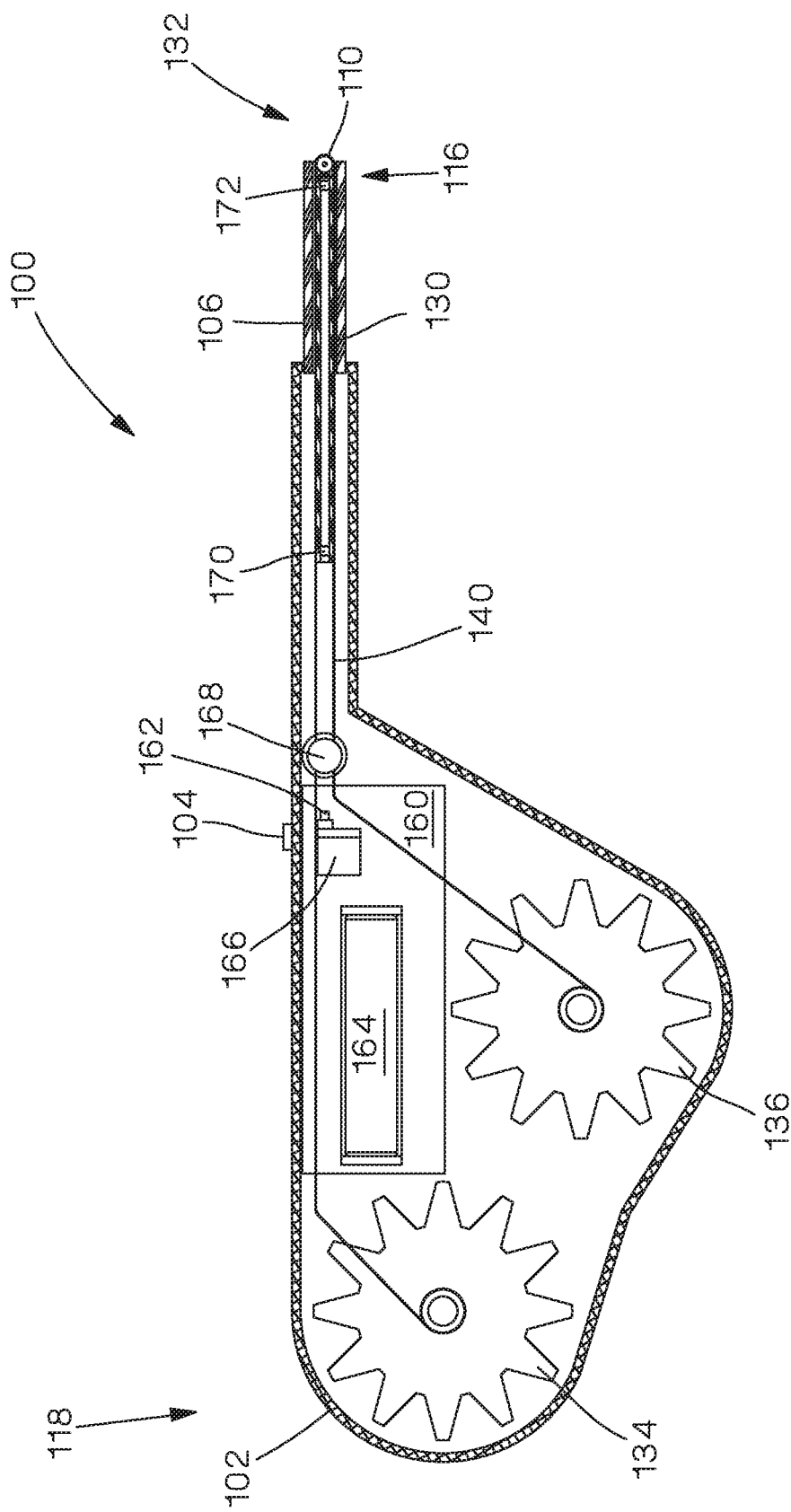
FIG. 3 is a side view of the fiber optic inspection and cleaning tool shown in FIG. 2 having the side cover removed to show at least some of the internal components included in the fiber optic inspection and cleaning tool.

FIG. 2 is a side view of the fiber optic inspection and cleaning tool 100 with the left side cover 101 removed to illustrate a view into the components and mechanisms within the housing 102. FIG. 3 is a side view of the fiber optic inspection and cleaning tool 100 with the left side cover 101 removed to illustrate a view into the components and mechanisms within the housing 102. FIGS. 2 and 3 depict the fiber optic inspection and cleaning tool 100 having a front end 116, a back end 118, and a probe head 132. Additionally, within the housing 102 is a pay-off reel 134, a take-up reel 136, a right-side cover 105, and an imaging system 160. The cleaning tape 140 travels off the pay-off reel 134, around the spindle 110 and onto the take-up reel 136. The imaging system 160 includes a battery 164, an imaging device 162, computing system 166, a light source 168, a first lens 170 and a second lens 172. The second lens 172 may be located towards the front end 116 of the fiber optic inspection and cleaning tool 100. The first lens 170 may be located between the second lens 172 and the imaging device 162. Although only two lenses are shown in the figure, one or more optical surfaces may be placed in between those lenses to correct for chromatic, spherical or other types of aberrations. The same set of lenses, namely the first lens 170 and the second lens 172, direct the light reflected from the connector 400 back to the imaging device 162. The imaging device 162 may include additional lenses or filters to improve the quality of the captured image.

The cleaning system of the present disclosure may include the elements not included as part of the imaging system, such as the pay-off reel 134, the take-up reel 136, the cleaning tape 140 and the spindle 110.

The battery 164 may be used to power one or more components in the computing system 166, the imaging device 162, the light source 168 or other components in the fiber optic inspection and cleaning tool 100. The imaging device 162 may be a camera or image sensor. The imaging device 162 is used to capture an adapter or connector end-face image (of the connector 400 under inspection and/or cleaning), at desired wavelengths of interest (e.g., blue spectral region, UV spectral region, visible, or near infrared spectral (NIR) region). The light source 168 may be an LED or laser that emits at a desired wavelength (e.g., blue LED or laser) to illuminate the end face of the connector. Optionally, according to some embodiments an internal structure 130 may extend from within the housing 102 into the probe 106 to support the first lens 170, the second lens 172, and/or the cleaning tape 140. The first lens 170 and the second lens 172, as shown in FIGS. 2 and 3, are configured to direct light from the light source 168 to the end-face 401 of the connector 400 under inspection and/or cleaning. The same set of lenses (the first lens 170 and the second lens 172) are used to direct the light reflected from the end-face 401 of the connector 400 to the imaging device 162 (in UV, visible, or NIR light/image format). The set of lenses (the first lens 170 and the second lens 172) are designed to provide an optical magnification effect to detect debris or other contamination on the end-face 401 (e.g., equivalent magnification to an optical microscope, 100×, 200×, or 400×).

The computing system 166 include hardware, software, and/or circuitry to control the imaging device 162 as well as other functionalities of the fiber optic inspection and cleaning tool 100. For example, the fiber optic inspection and cleaning tool 100 may also include a communication device (included as part of the computing system 166) providing the tool 100 the ability to communicate with external devices using known wireless communication protocols such as Bluetooth, WiFi, and/or Near Field Communication (NFC). The computing system 166 may analyze the images. In an alternate embodiment, the image is sent wirelessly to a remote computing system (e.g., computing system having greater processing resources such as a laptop, a desktop workstation computer, or mobile computing device) to process the image and identify a degree of contamination on the end-face 401 from the image. Additionally, the degree of contamination may be compared with the limits defined by industry standards (e.g., IEC 61300-3-35 Basic Test and Measurement Procedures Standard for Fiber Optic Interconnecting device and Passive Components).

The results of the image evaluation may be presented via the indicator 104, which may be an alarm, LED, or LCD screen with or without touch screen abilities. The fiber optic inspection and cleaning tool 100 may be configured to provide a pass/fail signal, such as a visual sign on the indicator 104. A passing signal may be shown on an LCD screen as a check mark or other indicator, or a green light on an LED. If the connector 400 passes, the operator will move on and test the next connector/adapter.

A fail condition may trigger additional signals or algorithms to clean the connector 400 and/or may be presented as an alert via the indicator 104. If not done automatically, the operator will clean the end face of the connector or adapter. This may be done by pressing a button or pressing the probe 106 against the connector 400 in order to trigger a mechanism to move the cleaning tape 140 from the window 144 (or visual portion) section to the cleaning portion 142 (seen in FIG. 4) to effectively clean the connector end-face 401 or adapter 402 that is being inspected.

If not done automatically, the cleaning tape 140 should be transitioned again to the window 144 by the operator so the fiber optic inspection and cleaning tool will evaluate the connector end-face 401 again. This procedure can be repeated until the connector 400 passes the required degree of cleanliness for its end-face 401.

Figure 4:
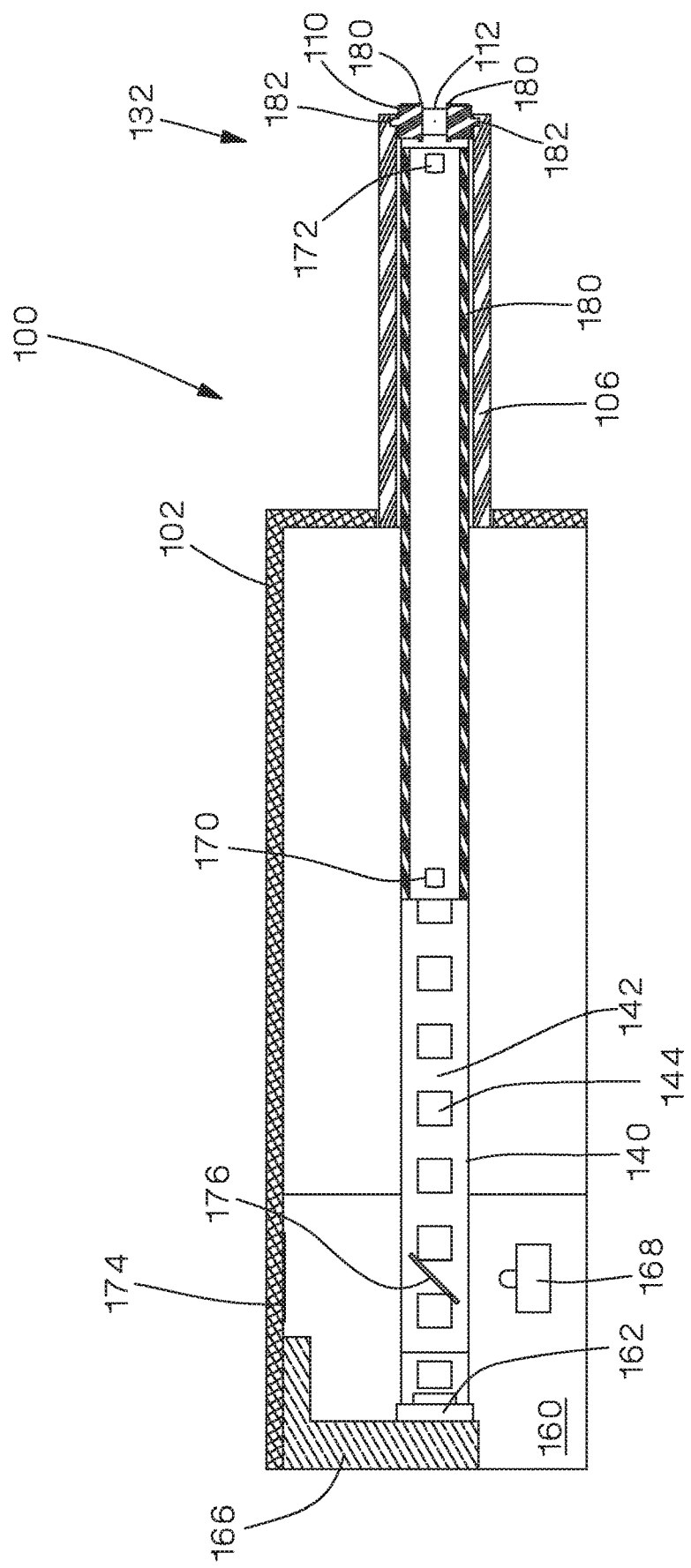
FIG. 4 is a top view of the fiber optic inspection and cleaning tool shown in FIG. 1 having at least a part of a top housing removed to shat at least some of the internal components included in the fiber optic inspection and cleaning tool.

FIG. 4 is a top-down view of a portion of the example fiber optic inspection and cleaning tool 100. FIG. 4 shows the fiber optic inspection and cleaning tool 100 absent a top cover and the top portion of the cleaning tape 140 (the portion coming off pay-off reel 134). What is seen in FIG. 4 is the bottom portion of the cleaning tape 140 (after it come off spindle 110 and is on its way to take-up reel 136). FIG. 4 depicts the imaging system 160 including a beam splitter 176 and a light absorber 174. The light absorber 174 is positioned in line with the light source 168 in order to minimize spurious light and undesired reflections. The beam splitter 176 may be a partial mirror or a polarization beam splitter that helps convey light from the light source 168 to the end-face 401 of the connector 400.

FIG. 4 provides a detailed view of a portion of the cleaning tape 140. The cleaning tape 140 includes open sections or windows 144 and the cleaning portion 142. The windows 144 may be apertures (cut outs) or transparent sections. If transparent, the windows 144 may be a transparent tape or strength substrate such as mylar, or any optical material transparent to the wavelength utilized by the light source 168. In the embodiment of FIG. 4, the windows 144 are apertures within the cleaning tape 140. The cleaning portion 142 has a fabric, cloth, absorption or adhesive material that removes contamination from the end-face 401 of the connector 400.

Figure 5:
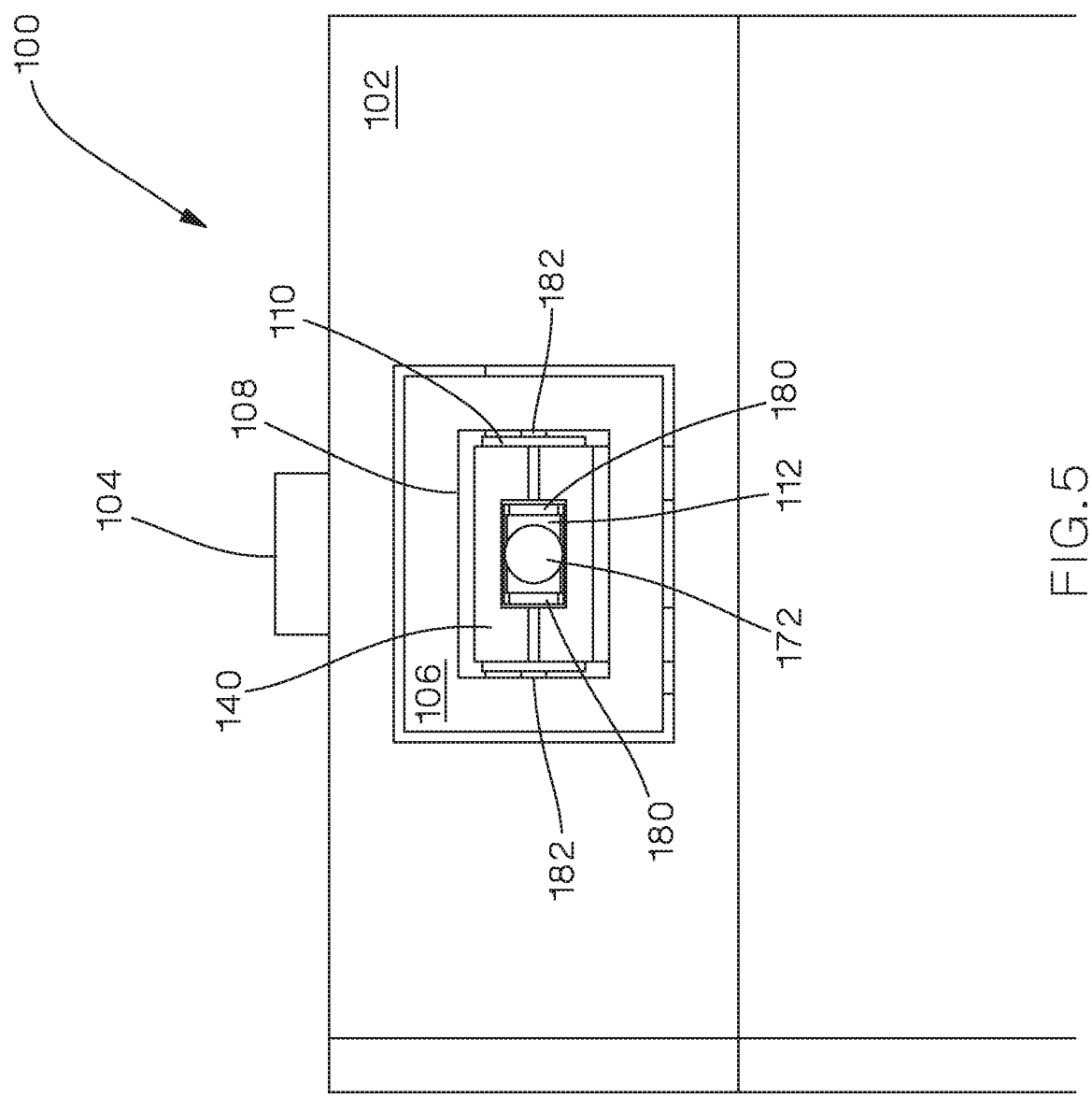
FIG. 5 is a front view of the fiber optic inspection and cleaning tool shown in FIG. 1 that shows a probe head included in the fiber optic inspection and cleaning tool.

FIG. 5 is a front view of the fiber optic inspection and cleaning tool 100 that better shows the probe head 132. From this front view, the probe 106 is shown to be protruding from the third aperture 103 in the housing 102. Within the first aperture 108, the cleaning tape 140 surrounds the spindle 110, a window 144 of cleaning tape 140 lines up with the second aperture 112. The spindle 110 includes spindle tabs 180 on either side of the second aperture 112. The spindle tabs 180 help to keep the cleaning tape 140 and the window 144 aligned precisely with the second aperture 112. The imaging device 162 may be synchronized with the movement of cleaning tape 140 to captures images of the connector end-face 401, or adapter 402, under inspection when the window 144 is in front of the connector end-face 401, or adapter 402, under inspection, not when the connector end-face 401 is being cleaned by the cleaning portion 142. The spindle 110 may also include support structures 182 to help keep the spindle 110 in place in the probe head 132. The second lens 172 is visible through the second aperture 112. The spindle 110 is cylindrical and provides a line of sight from the imaging device 162 to the connector end-face 401.

The second lens 172 and/or the first lens 170 have a predetermined numerical aperture (NA) and antireflection coatings to provide images with a desired level of resolution and contrast to identify possible contamination or debris on the connector end-face 401. The second lens 172 and/or internal structure 130, which is preferably translucent and supports the second lens 172, can be in partial contact with the cleaning tape 140 to provide the required pressure or force to clean the connector end-face 401. Alternatively, the second lens 172 can be closer to the inside of the spindle 110 that rotates with the cleaning tape 140 while providing enough cleaning force on the connector end-face 401.

Figure 6:
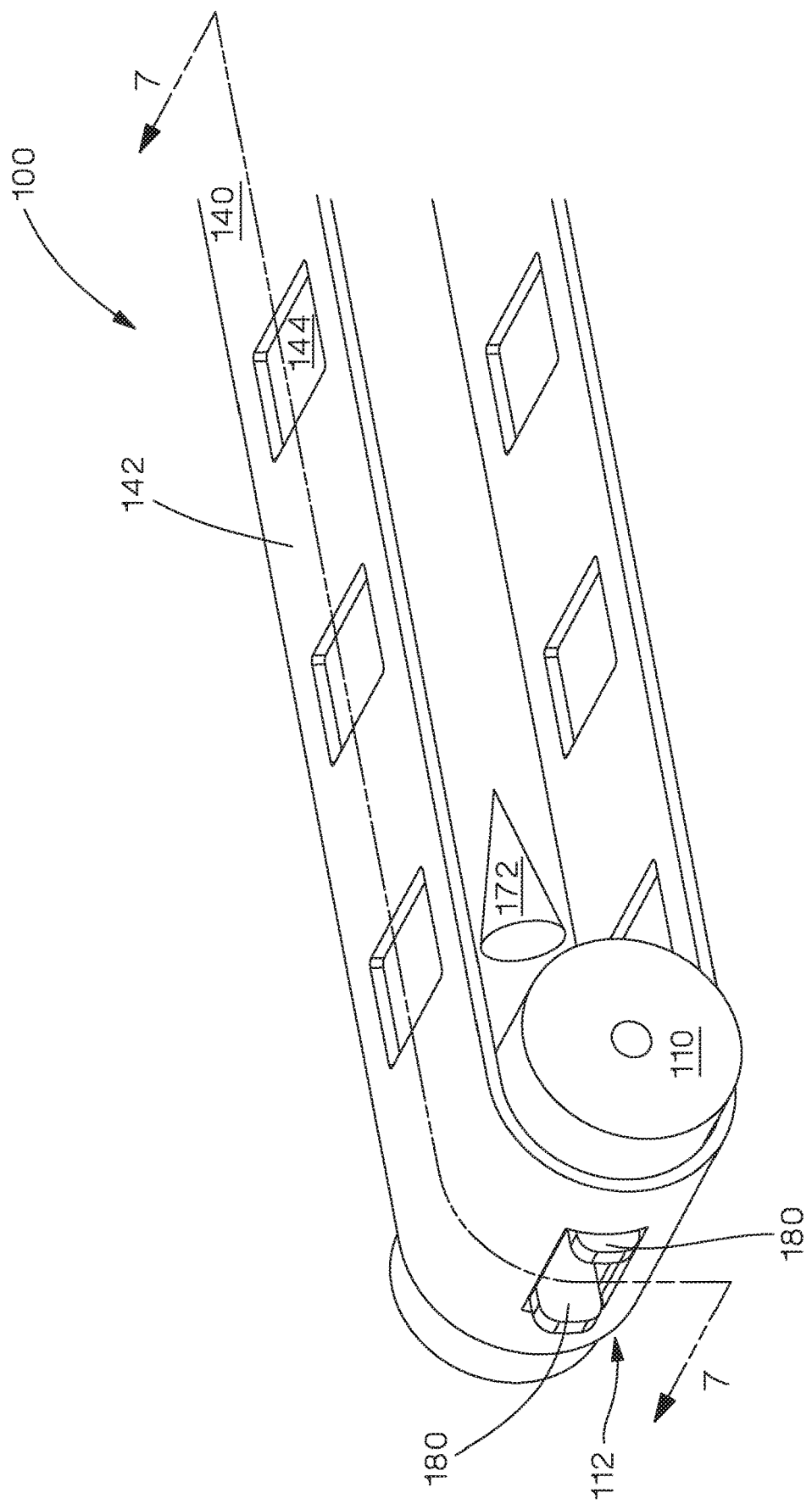
FIG. 6 is a perspective view of internal components of the fiber optic inspection and cleaning tool shown in FIG. 1 that illustrates an interaction of a spindle with a segmented tape.
Figure 7:
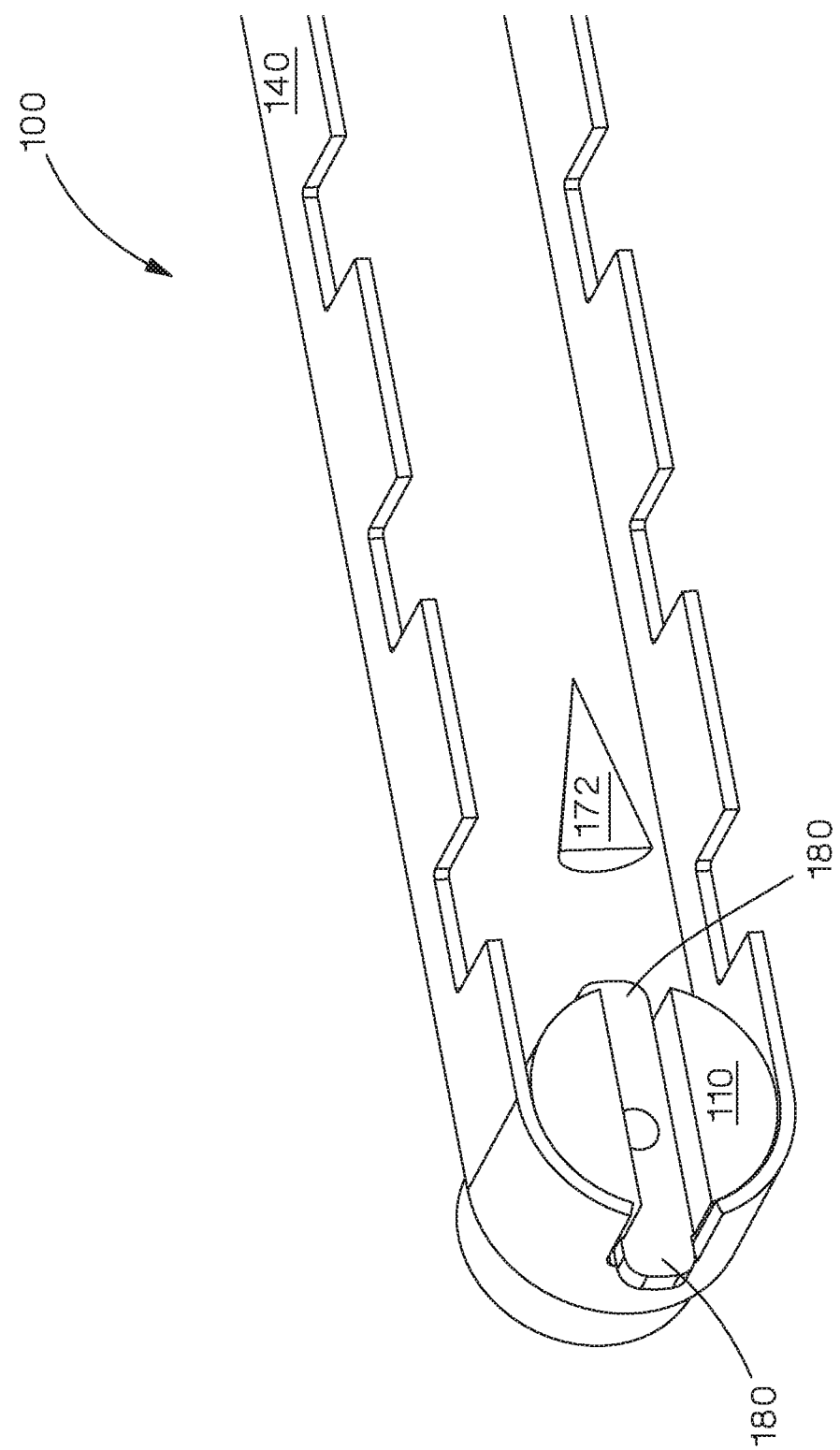
FIG. 7 is a sectional view of the internal components of the fiber optic inspection and cleaning tool taken along line 7-7 shown in FIG. 6.

FIGS. 6 and 7 show the interaction of the spindle 110 with the segmented cleaning tape 140 of the fiber optic inspection and cleaning tool 100, where FIG. 7 shows a cross-sectional view of the fiber optic inspection and cleaning tool 100 taken along line 7-7 from FIG. 6. As the cleaning tape 140 advances to rotate around the spindle 110, the spindle 110 correspondingly rotates so that the spindle tabs 180 catch the windows 144 of the cleaning tape 140.

Figure 10:
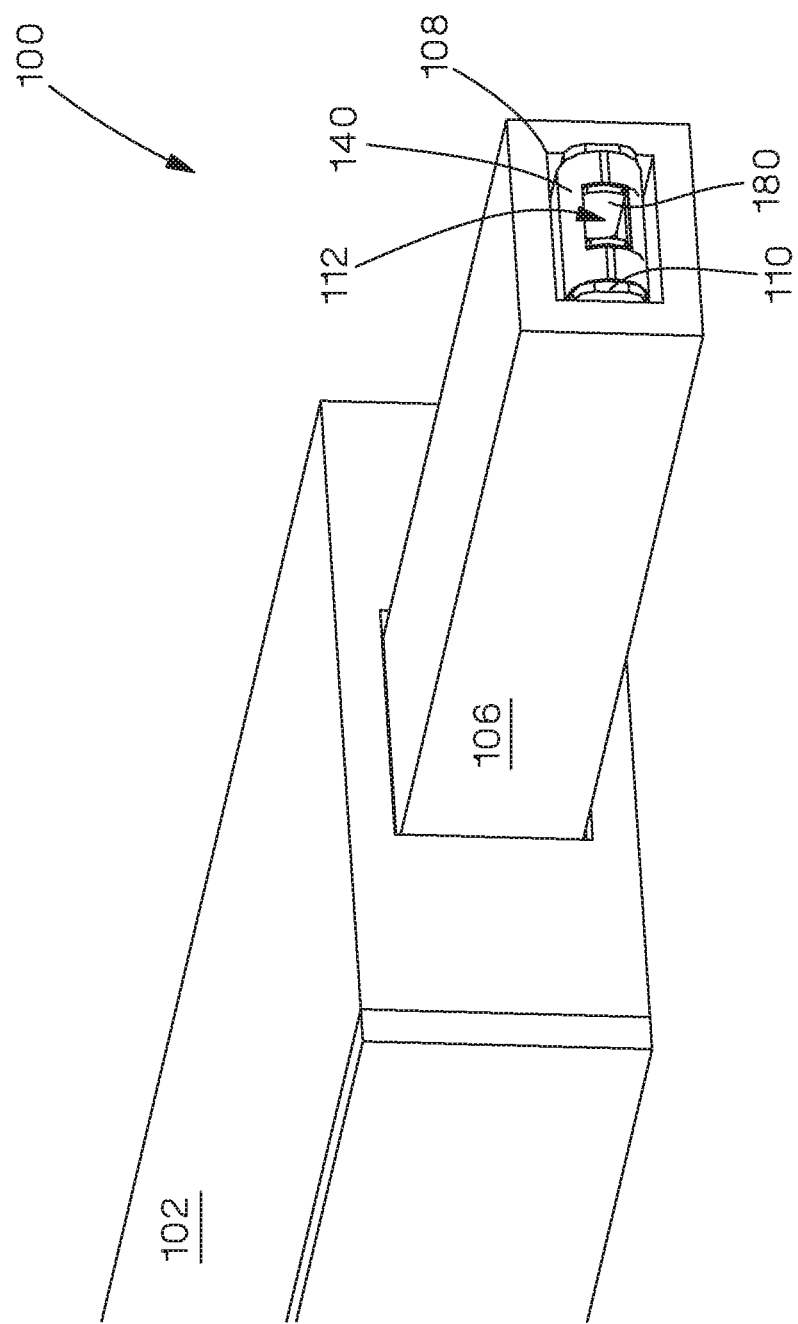
FIG. 10 is a front view of the fiber optic inspection and cleaning tool shown in FIG. 1 with a probe in an extended state.
Figure 11:
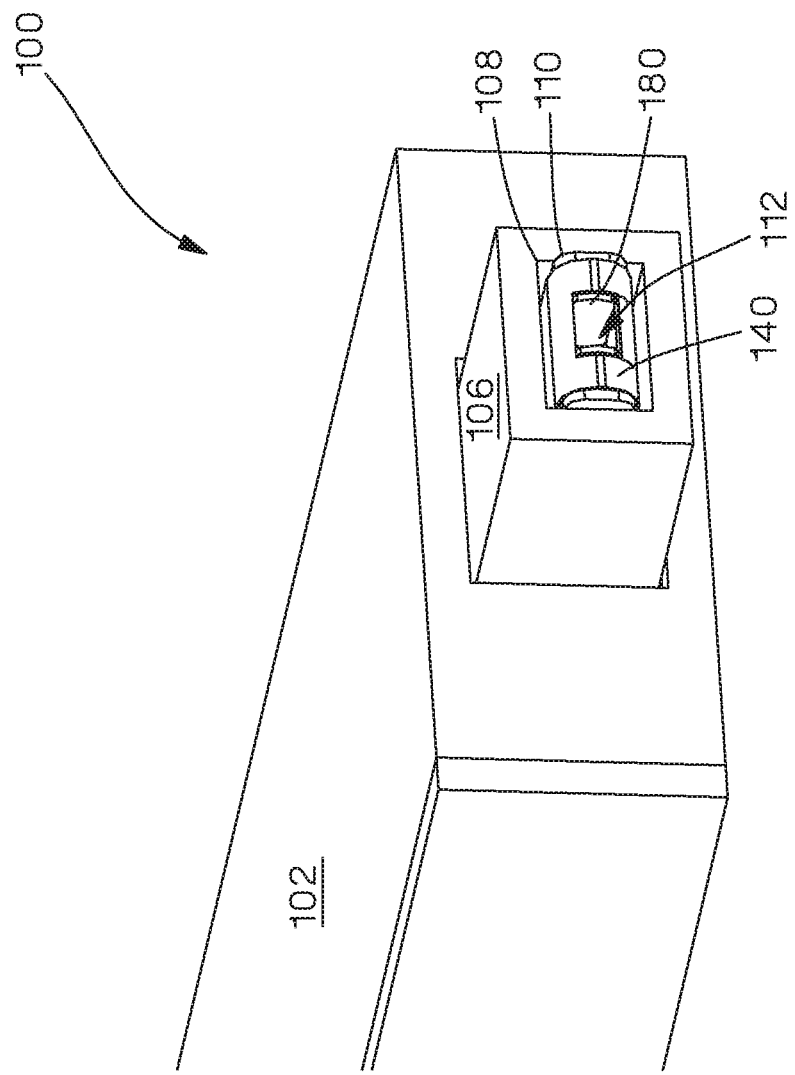
FIG. 11 is a front view of the fiber optic inspection and cleaning tool shown in FIG. 1 with the probe in a retracted state.

In addition or alternatively, FIGS. 10 and 11 show a mechanism by which the cleaning tape 140 advances. FIG. 10 shows a perspective view of a portion of the front end 116 of the fiber optic inspection and cleaning tool 100 when the probe 106 is in an extended state. FIG. 11 shows a perspective view of a portion of the front end 116 of the fiber optic inspection and cleaning tool 100 when the probe 106 is in a retracted state. When the probe 106 is pressed against the adapter/connector under test, the probe 106 retreats into the housing 102, and causes the cleaning tape 140 to shift. The retreat of the probe 106 is shown in FIG. 11, however the movement of the cleaning tape 140 is not portrayed in FIG. 11.

In the fiber optic inspection and cleaning tool 100 some of the imaging components, such as the first lens 170 and the second lens 172, are surrounded by the cleaning tape 140. The cleaning tape 140 is free to move between the connector end face and the imaging device 162. The probe 106 holds the probe head 132 that fits into an adapter (or connector) under inspection (e.g., an MPO adaptor that is the input port of a cassette). Different mechanisms may be utilized to control the movement of the cleaning tape 140, as is required to clean the connector end-face. A button (not shown) may be placed and connected to the pay-off reel 134 and/or take-up reel 136 to move the cleaning tape 140. The pay-off reel 134 and/or take-up reel 136 may be made of gears. Another method is that the probe 106 is connected to the gears of the take-up reel 136 or pay-off reel 134 (as seen in FIGS. 10 and 11). When the probe 106 is pressed against the adapter/connector under test, the gears and cleaning tape 140 are moved, as the probe 106 is moved partially back into the housing 102. Alternatively, the movement of the cleaning tape 140 may also be controlled electronically or using a motor.

In order for the cleaning tape 140 to effectively clean the end face of the connector the cleaning tape 140 should preferably have a semi-rigid or rigid backing surface. This backing surface applies a counter force to the end-face of the connector that is pushed up against the cleaning tape 140. This is analogous to how a person cleans a window with a cleaning agent and cloth: the harder a person applies a force on the cloth as they wipe the window, the cleaner the window becomes. Similarly, to provide a bit more force to the end-face of the connector, the spindle 110 is used as a rigid backing surface to the cleaning tape 140, while still allowing the imaging device 162 to see through the spindle 110 at particular rotational intervals.

The spindle 110 has a cylindrical surface that includes a solid circumferential surface alternating with an internal opening. Once the end-face of the connector is positioned perpendicular to the cleaning tape 140, the spindle 110 rotates tangentially to the cleaning tape 140. The solid surface of the spindle 110's perimeter is used as the semi-rigid or rigid backing that allows the cleaning tape 140 to properly swipe and clean the end-face of the connector. The spindle tabs 180 line up to the windows 144 that keep the spindle 110 aligned to the cleaning tape 140 as the spindle 110 rotates. The window 144 provides an opening through which the imaging device 162 (i.e., via either a direct line of sight, a light-pipe or reflective element such as a lens) can obtain a clear view of the end face of the fiber optic connector.

The cleaning tape 140 may be manufactured from an antistatic cloth material commonly used in the fiber optic industry. Optionally, a secondary mylar substrate (strength substrate) may be added to the back of the antistatic cloth material which may help prevent the cloth material from stretching out and may have an anti-reflective coating to prevent light from reflecting back off the connector end face and blinding the imaging device 162.

In an embodiment, additional components can be added along the tape path for further reduction of electrostatic. For example, a smoothed metallic surface (e.g., aluminum or copper) can be placed near the first lens 170 or the second lens 172 to help reduce electrostatic.

In an example, the smaller the fiber optic inspection and cleaning tool 100, the less instances of cleaning the fiber optic inspection and cleaning tool 100 can provide as the reels 134 and 136 will be smaller. However, when the fiber optic inspection and cleaning tool 100 is smaller, it is more portable. Therefore, there is a trade-off between the number of cleaning instances and the size of the fiber optic inspection and cleaning tool 100.

Figure 8:
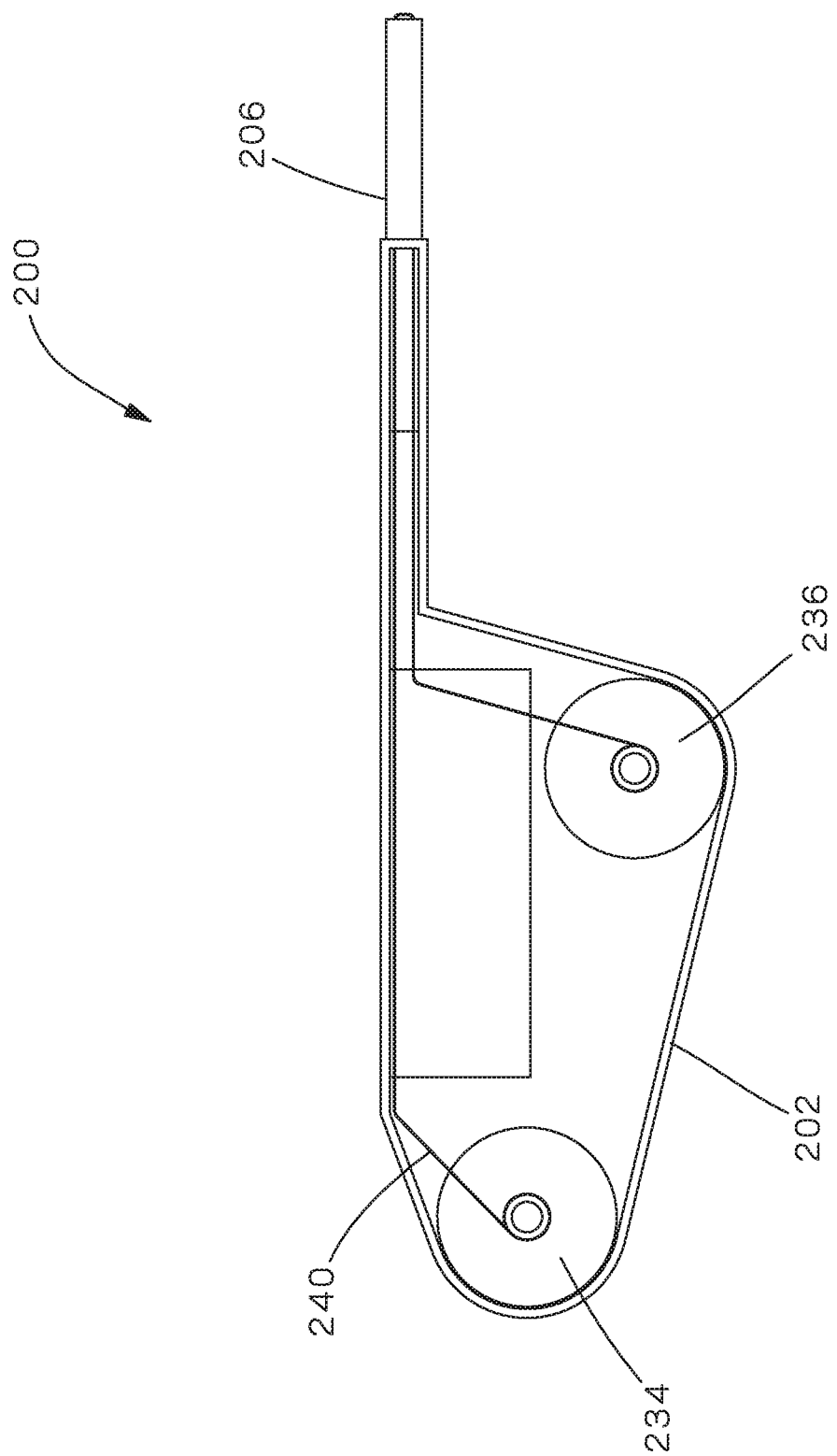
FIG. 8 is a side view of the fiber optic inspection and cleaning tool shown in FIG. 1 having an imaging system removed, according to an embodiment of the present disclosure.
Figure 9:
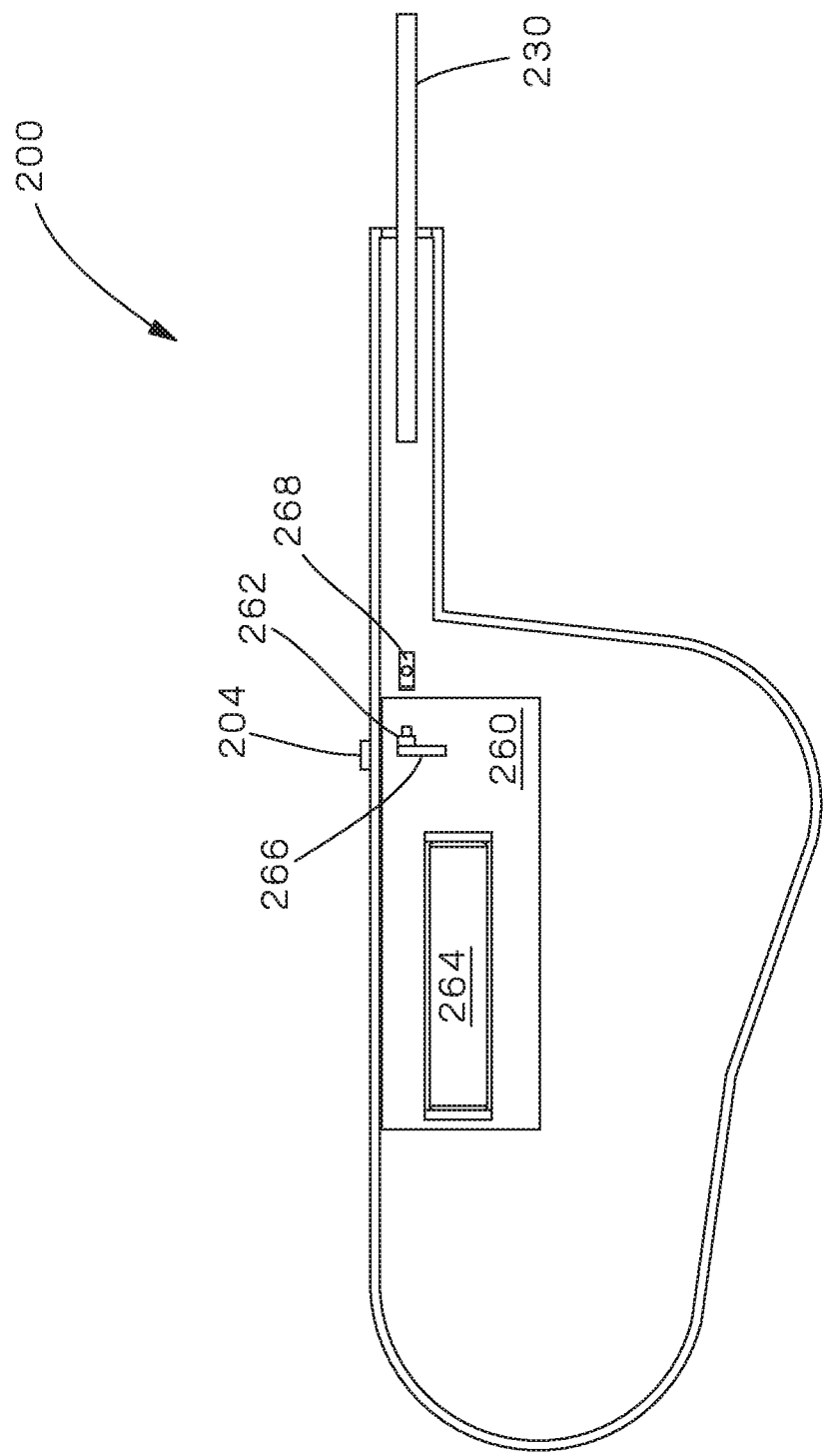
FIG. 9 is a side view of the fiber optic inspection and cleaning tool shown in FIG. 7 with the imaging system included.

FIGS. 8 and 9 depict an alternate embodiment where the most expensive components of a fiber optic inspection and cleaning tool 200 are detachable and reusable. FIG. 8 depicts all the components that may be discarded, such as a housing 202, a used tape 240, a pair of reels 234 and 236, and a probe 206. FIG. 9 depicts the reusable optical and electrical components. The reusable components include an imaging system 260, internal structure 230 (housing lenses that are not depicted in FIG. 9), light source 268, and indicator 204. The imaging system 260 includes a battery 264, electronics/processors 266, and imaging device 262.

Figure 12:
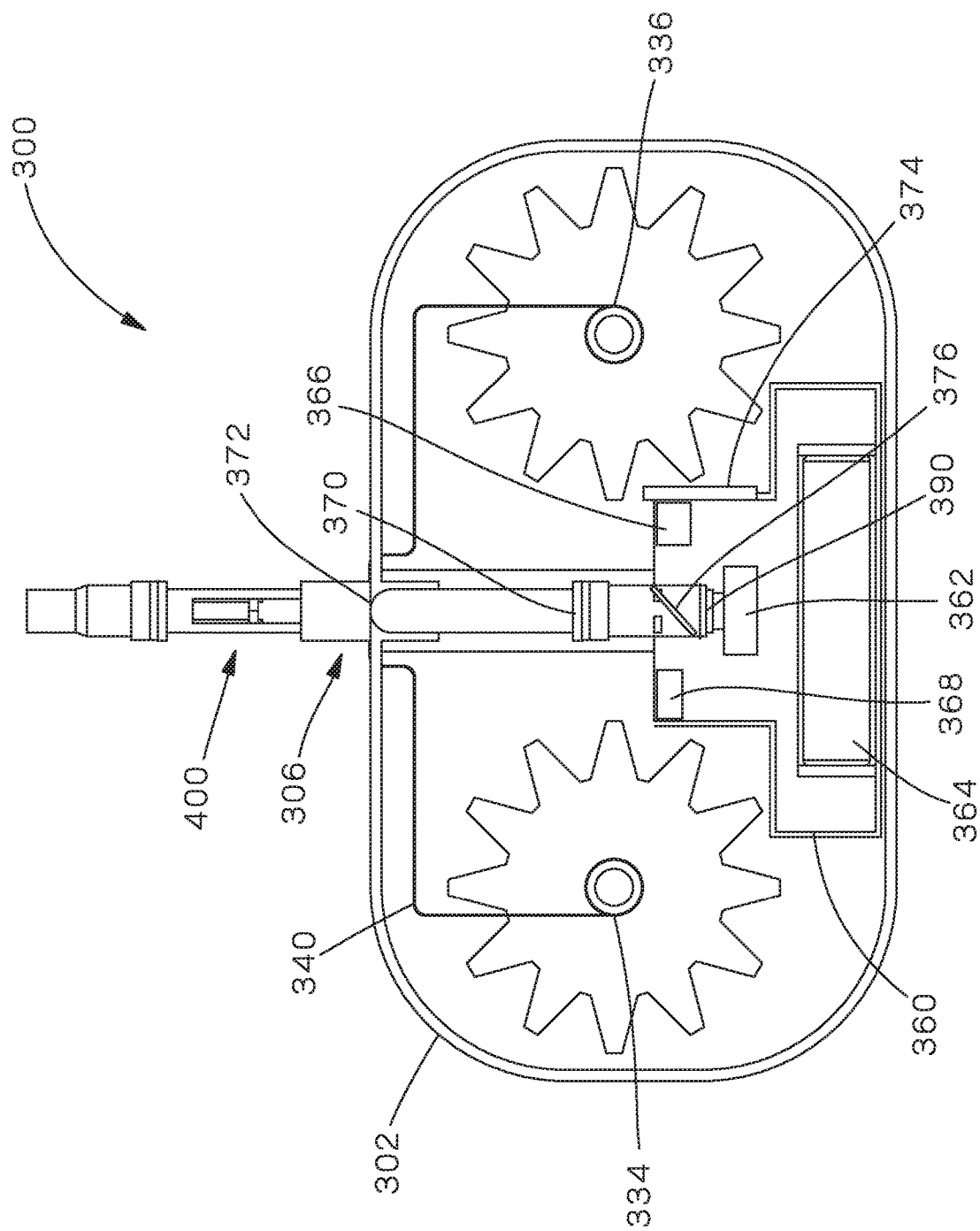
FIG. 12 is a top down view of a fiber optic inspection and cleaning tool having a top cover removed to show at least some internal components, according to an alternative embodiment of the present disclosure.
Figure 13:
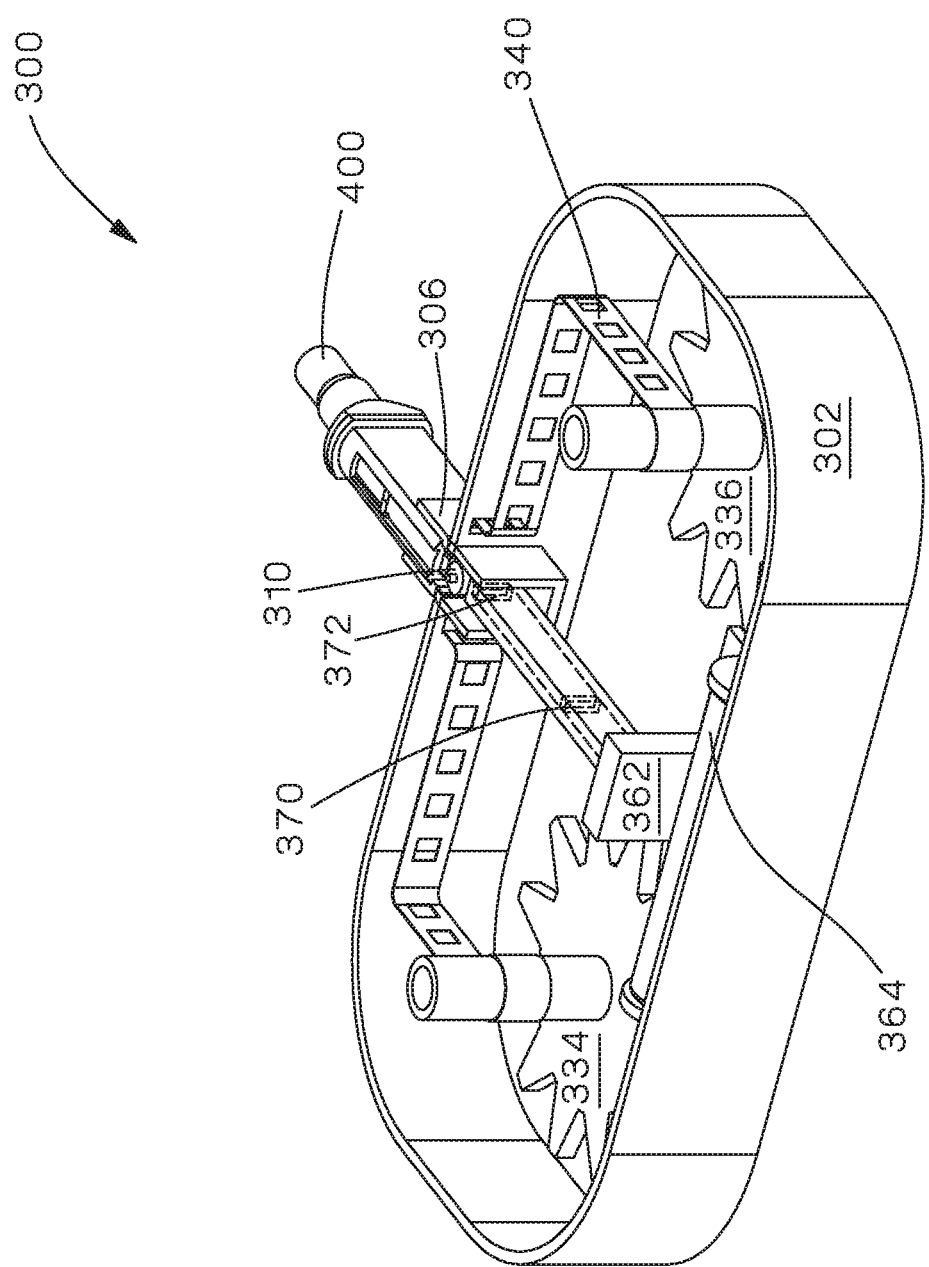
FIG. 13 is a perspective view of the fiber optic inspection and cleaning tool shown in FIG. 12.
Figure 14:
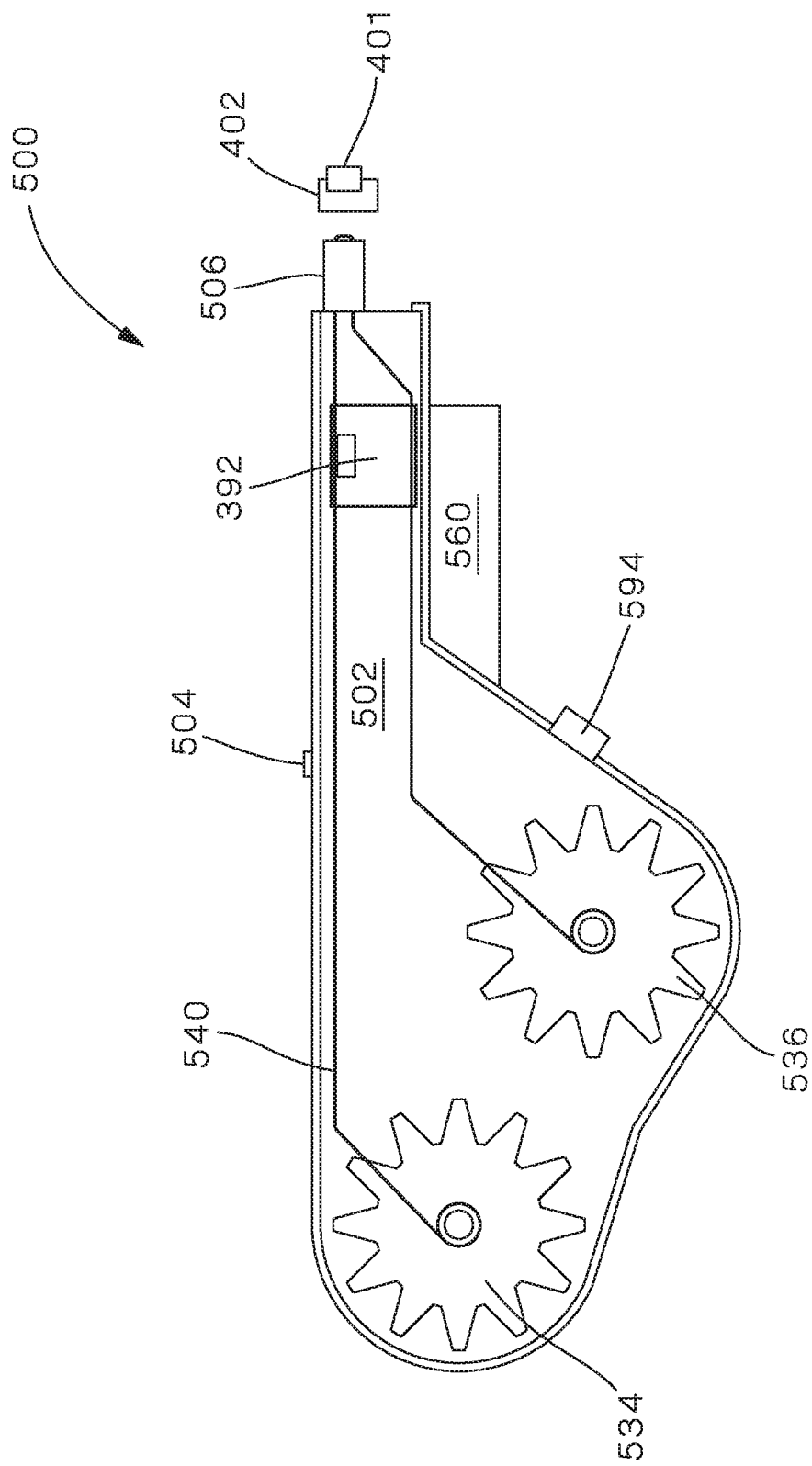
FIG. 14 is a side view of a fiber optic inspection and cleaning tool having a side housing removed to show at least some internal components, according to an alternative embodiment of the present disclosure.

FIGS. 12 and 13 disclose another exemplary fiber optic inspection and cleaning tool 300 according to an alternative embodiment of the present disclosure. The fiber optic inspection and cleaning tool 300 is used to clean and inspect connectors and connector end-faces, such as from connector 400, from patch cords, interconnects or cable trunks. The features and main functionalities of the fiber optic inspection and cleaning tool 300 are similar to those in the fiber optic inspection and cleaning tool 100.

The fiber optic inspection and cleaning tool 300 includes a housing 302, an adapter 306, an imaging system 360, a pay-off reel 334, a take-up reel 336, and a cleaning tape 340. The imaging system 360 incudes a battery 364, a light source 368, an imaging device 362, a lens/filter 390, a first lens 370, a second lens 372, an absorber 374, electronics/processors 366, and a beam splitter 376. An adapter 306 is used in place of a probe in order to receive the connector 400. The cleaning tape 340 is similar to the cleaning tape 140 and includes windows to provide an opportunity for the camera to view the end face of the connector. A spindle 310 can be seen in FIG. 13 having a vertical configuration, rather than a horizontal configuration like spindle 110. Optionally, the fiber optic inspection and cleaning tool 300 may include an indicator (not shown). As noted above, the functionalities of each feature of the fiber optic inspection and cleaning tool 300 are similar to the functionalities of the features of the fiber optic inspection and cleaning tool 100.

The configuration of fiber optic inspection and cleaning tool 300 may provide more functionalities and features to place optical, electronic, and mechanical components. The size of the reels 334 and 336 may be increased. In the embodiment, the electrical and optical components may be placed in a detachable module that may be reused in multiple devices. The mechanical components may be discarded or recycled.

A report with test data (time, operator, etc.) and the data related to the connector status and images may be stored in the tool or in an external device. Alternatively, information may be stored in the cloud for each connector and may be accessible by customers.

In fiber optic inspection and cleaning tool 100, 200 and 300 the imaging device or camera, the spindle, and the cleaning tape are in alignment along a direct visual axis. This means the camera is at a point behind the spindle in comparison to the connector under test, but the camera is directly in line with the spindle in order to see through the spindle aperture while the spindle has the cleaning tape going around it.

FIGS. 14-17B disclose an exemplary fiber optic inspection and cleaning tool 500 according to another alternative embodiment of the present disclosure, where an imaging system 560 is located adjacent to a housing 502. The fiber optic inspection and cleaning tool 500 includes a housing 502, an indicator 504, an imaging system 560, a cleaning tape 540, an attachment section 592, a probe 506 to interface with an adapter 402 or connector end-face 401, a button, a pay-off reel 534, and a take-up reel 536.

The features and main functionalities of the fiber optic inspection and cleaning tool 500 are similar to those in the fiber optic inspection and cleaning tool 100. For example, the cleaning system of the fiber optic inspection and cleaning tool 500 may include the elements not included as part of the imaging system 560, such as the pay-off reel 534, the take-up reel 536, the cleaning tape 540 and the spindle 510.

Figure 15:
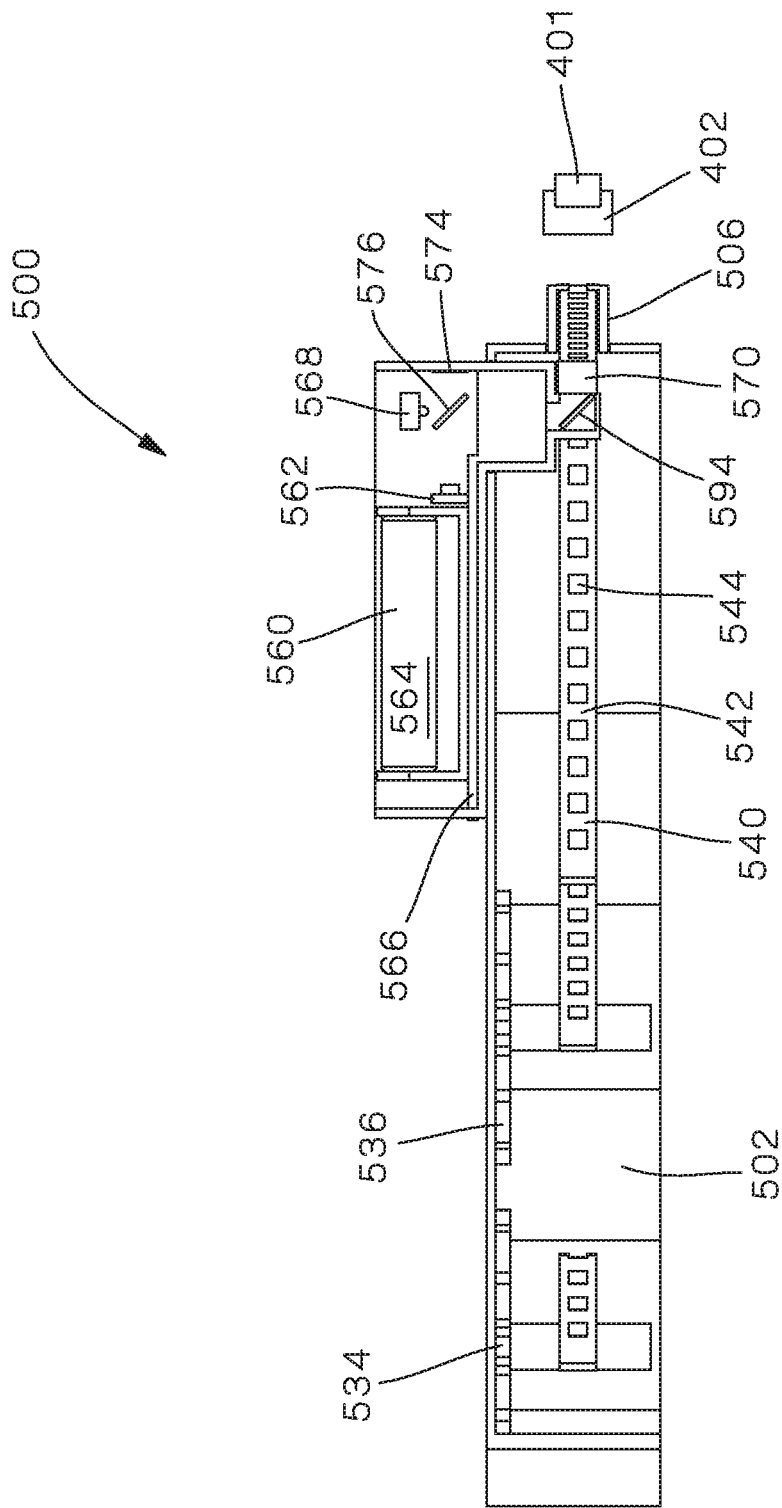
FIG. 15 is a top view of a portion of the fiber optic inspection and cleaning tool shown in FIG. 14

The imaging system 560 can be attached or detached from the fiber optic inspection and cleaning tool 500 through the attachment section 592. Although seen in FIG. 14 as being visible on the opposite side of the housing 502, in an alternate embodiment as seen in FIG. 15, the imaging system 560 may attach within the housing 502 and may not be visible on the opposite side of the housing 502. In some embodiments, the cleaning system and imaging system 560 may work independently from each other. The separation of the modules allows for reusing the optical module, which may be significantly more expensive than the cleaning module. The cleaning module (in housing 502) can provide several hundreds of cleaning instances, and then be discarded or recycled. The imaging system 560 may be attached to new cleaning modules when required.

Figure 16:
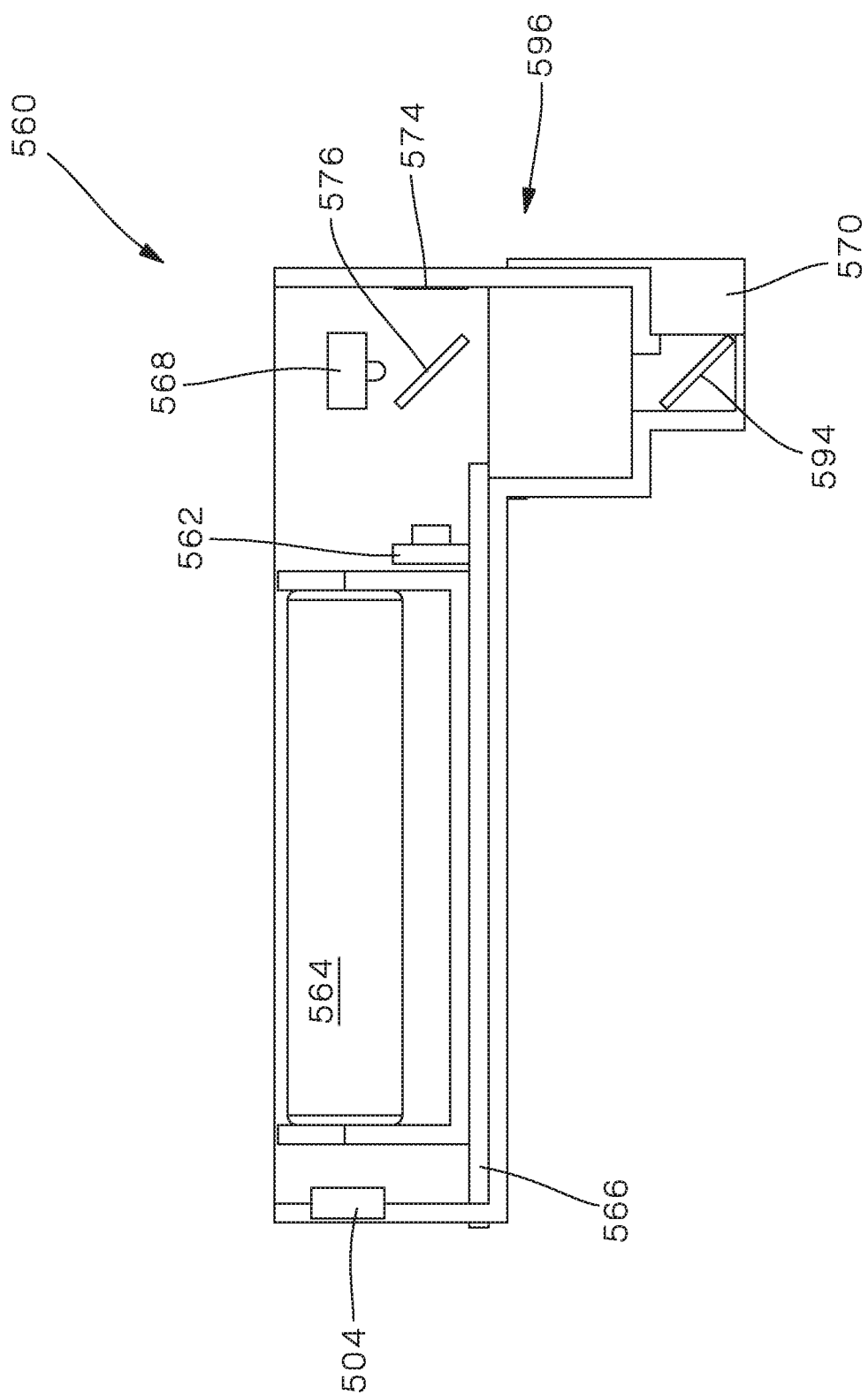
FIG. 16 is a top view of an imaging system component of the fiber optic inspection and cleaning tool shown in FIG. 15.

FIGS. 15 and 16 are top views of a portion of the example fiber optic inspection and cleaning tool 500 demonstrating the configuration of imaging system 560. FIG. 15 shows a view of the fiber optic inspection and cleaning tool 500 absent a top cover and the top portion of the cleaning tape 540 (the portion coming off pay-off reel 534). What is shown in FIG. 15 is the portion of the cleaning tape 540 after it come off spindle 510 (seen in FIG. 17A) and is on its way to take-up reel 536. FIG. 15 depicts the imaging system 560 connecting into the housing 502 between the probe 506 and the take-up reel 536. The imaging system 560 includes a battery 564, a light source 568, an imaging device 562, electronics/processors 566, a beam splitter 576, a light absorber 574, a mirror 594, and a lens 570. The lens 570 may include more than one lens. The battery 564 may be changed as needed. The cleaning tape 540 includes cleaning sections 542 and windows 544. FIG. 16 depicts an indicator 504 located toward the rear of the imaging system 560, located on top of the imaging system 560. Alternatively, the indicator 504 may be located directly on the housing 502.

The light from the light source 568 (e.g., LEDs or lasers) are partially transmitted and partially reflected by a beam splitter 576 which can be polarization dependent or polarization independent. The transmitted light is reflected by the mirror 594 which redirects the light to a lens or set of lenses 570. The lens 570 illuminates the adapter 402 or connector end-face 401 under inspection. The same lens 570 is used to transmit the light reflected from the adapter 402 or end-face 401 to the mirror 594 and from there to the beam splitter or splitters 576 which partially reflects the light to the imaging device 562. The visual imaging axis disclosed (camera to beam splitter to mirror to lens and back) follows an "S" shape that intersects with the cleaning system wherein the imaging system 560 attaches to the cleaning system through an attachment section 592. This aligns the lens 570 along the same axis as the spindle 510 and cleaning tape 540. This can be seen in FIG. 17(b), as the lens 570 ends up directly behind the probe 506, aligned with the aperture in the spindle 510. In an alternate embodiment, the imaging device 562 may be a camera or multiple cameras.

As can be seen from FIGS. 15 and 16, when viewed from above the imaging system 560 forms an "L" shape. An attachment section 596 is a portion of the imaging system 560 furthest away from the light source 568 in the direction the light travels (towards the housing 502).

As with the previous embodiments, the imaging system 560 captures images of the adapter 402 or the connector end-face 401 and evaluates their level of cleanliness. If the fiber optic inspection and cleaning tool 500 determines the adapter 402 or the connector end-face 401 is not clean compared to a cleanliness threshold, the cleaning process requires the cleaning tape 540 to move over the adapter 402 or the connector end-face 401 to remove contamination from the end face. The pushing of a button may initiate advancement of the cleaning tape. In addition to a pass/fail condition regarding cleanliness, the indicator 504 (e.g., an LCD or LED) may indicate the state of the apparatus, such as battery 564 status, selection menus, and/or additional information about the test.

Figure 17A:
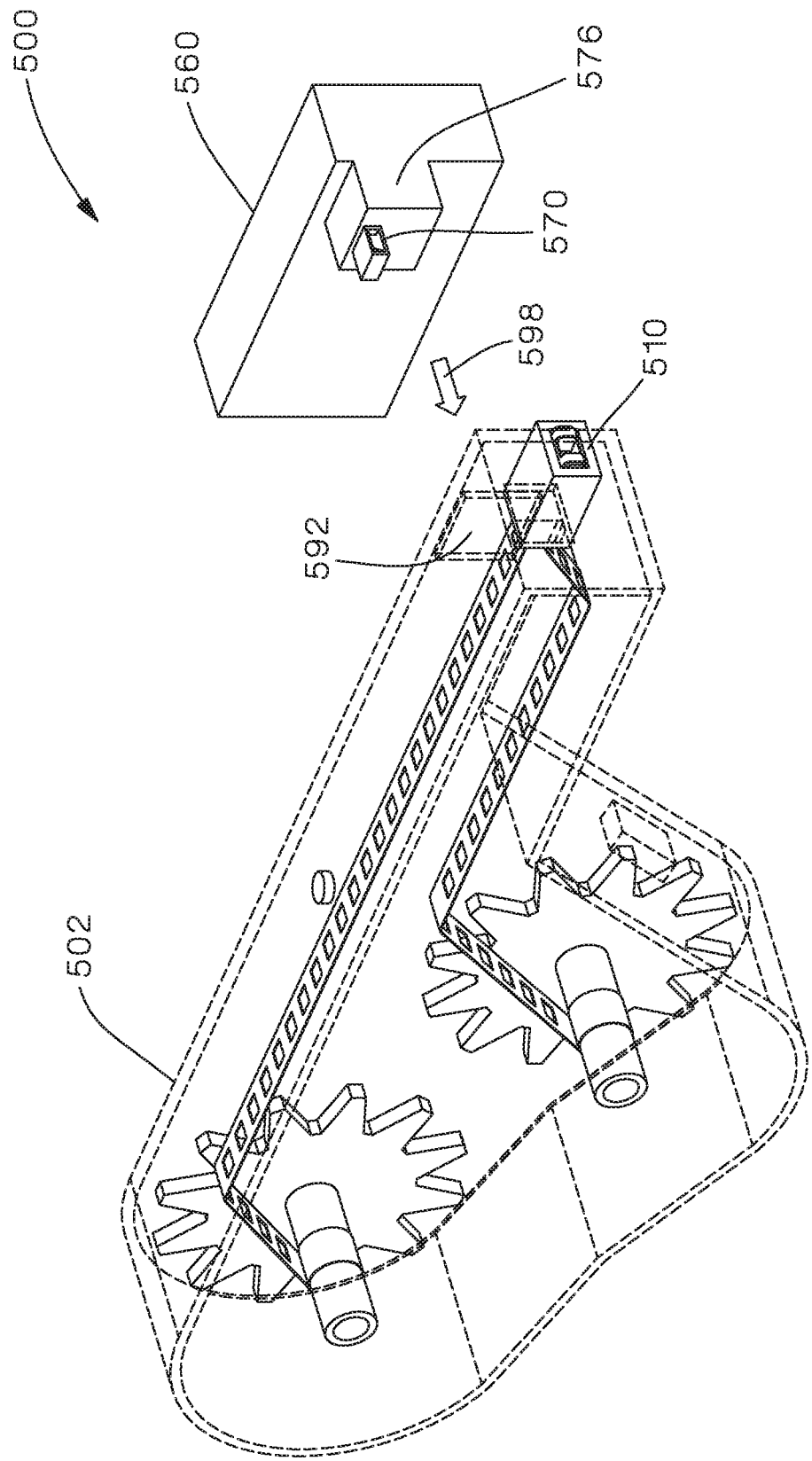
FIG. 17A is a view showing the imaging system and cleaning system separated of the example fiber optic inspection and cleaning tool shown in FIG. 14.
Figure 17B:
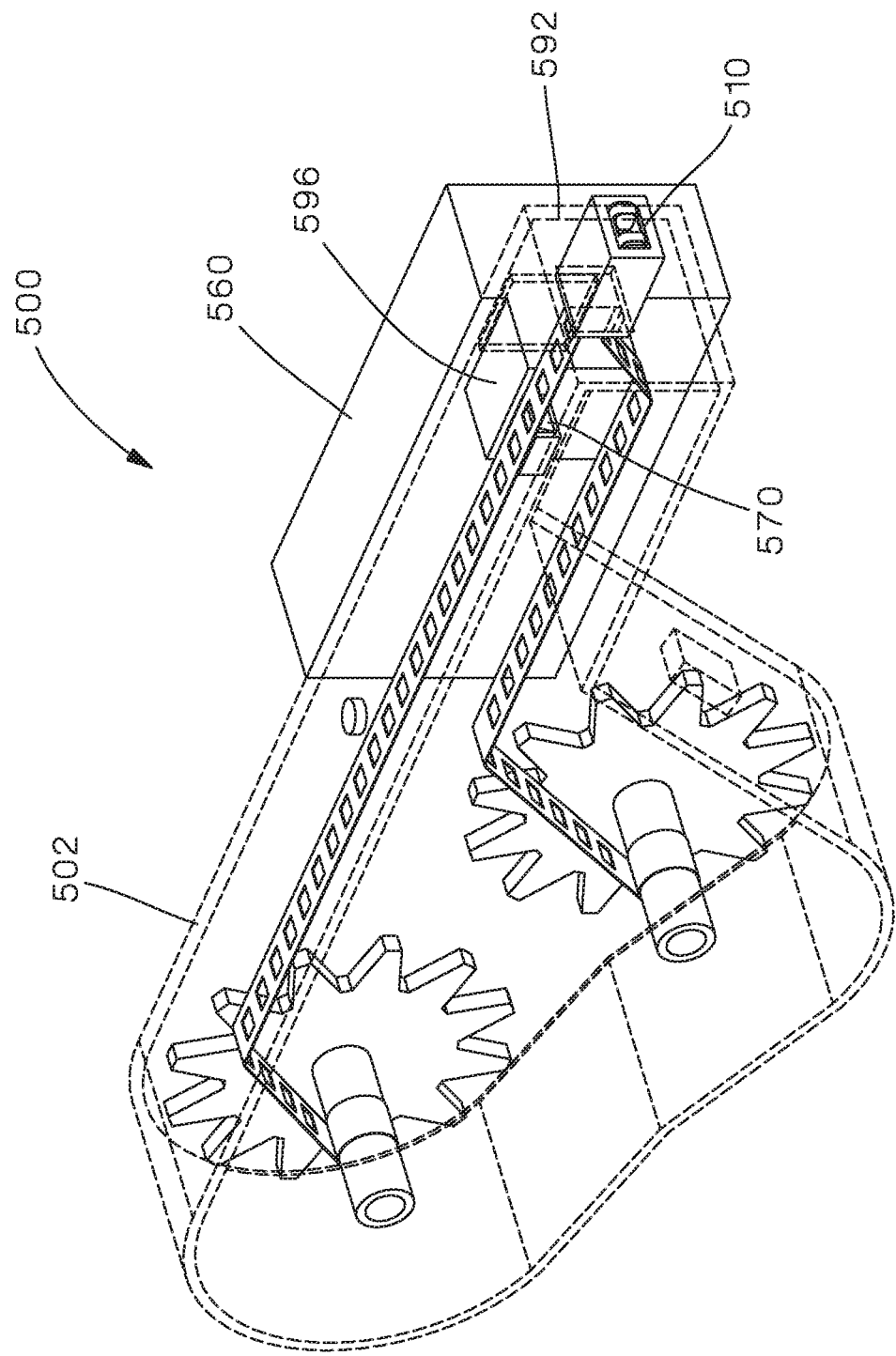
FIG. 17B is a view showing the integrated imaging system and cleaning system of the example fiber optic inspection and cleaning tool shown in FIG. 14.

FIG. 17A is a view showing the imaging system and cleaning system separated of the example fiber optic inspection and cleaning tool 500, and FIG. 17B is a view showing the integrated imaging system and cleaning system of the fiber optic inspection and cleaning tool 500. An arrow 598 in FIG. 17A shows the movement of the imaging system 560 in order to connect with the housing 502 of the cleaning portion of the fiber optic inspection and cleaning tool 500. As imaging system 560 connects with the housing 502, the attachment section 596 goes into attachment section 592, and lens 570 is in line with spindle 510 and tape 540.

The described cleaning and inspection tool provides an apparatus and method for fast inspection and cleaning of optical connectors and adapters. The apparatus can inspect and clean optical interconnects or patch cord connector end faces without the need of manually removing and installing the connector from an inspection tool to a cleaner device. Alternatively, the apparatus can inspect and clean patch panels or cassette adapters without removing the adapter from the inspection tool to another cleaning tool. The disclosed device may be applied to several types of duplex or parallel optical connectors such as LC, SC, CS, SN, MTP/MPO. It may also be used with their connector adapters.

Note that while the present disclosure includes several embodiments, these embodiments are non-limiting, and there are alterations, permutations, and equivalents, which fall within the scope of this disclosure. Additionally, the described embodiments should not be interpreted as mutually exclusive, and should instead be understood as potentially combinable if such combinations are permissive. It should also be noted that there are many alternative ways of implementing the embodiments of the present disclosure. It is therefore intended that claims that may follow be interpreted as including all such alterations, permutations, and equivalents as fall within the true spirit and scope of the present disclosure.

What is claimed is:

1. A fiber optic end-face inspection and cleaning apparatus, comprising:
    a housing;
    a cleaning system comprising:
        a pay-off reel;
        a take-up reel;
        a spindle; and
        a cleaning tape, wherein the cleaning tape travels off the pay-off reel, around the spindle, and onto the take-up reel, the cleaning tape comprising:
            a cleaning portion configured to clean an end face of a fiber optic connector; and
            a visual portion configured to enable the camera to image the end face of the fiber optic connector; and
    an imaging system comprising:
        a light source; and
        a camera, wherein the camera, the spindle and the tape are in alignment along a direct visual axis; and
    wherein the pay-off reel, the take-up reel, camera and light source are located within the housing.

2. The fiber optic end face inspection and cleaning apparatus of claim 1, further comprising an adapter for receiving an end face of a fiber optic connector.

3. The fiber optic end face inspection and cleaning apparatus of claim 1, wherein the visual portion is transparent.

4. The fiber optic end face inspection and cleaning apparatus of claim 1, wherein the visual portion is a cut-out in the cleaning tape.

5. The fiber optic end-face inspection and cleaning apparatus of claim 1, wherein the cleaning tape includes two layers, wherein at least one of the two layers is a strength substrate.

6. The fiber optic end-face inspection and cleaning apparatus of claim 5, wherein the strength substrate is mylar.

7. The fiber optic end-face inspection and cleaning apparatus of claim 1, wherein the tape includes a non-reflective coating.

8. The fiber optic end face inspection and cleaning apparatus of claim 1, wherein the spindle includes a spindle aperture including tabs.

9. The fiber optic end face inspection and cleaning apparatus of claim 8, wherein the imaging system further comprises:
    at least one lens, wherein the at least one lens directs light from the light source through the spindle aperture.

10. The fiber optic end face inspection and cleaning apparatus of claim 1, further comprising:
    a probe, wherein the spindle is located at a first end of the probe and a second end of the probe is attached within the housing, and the first end of the probe is configured to be insertable into an adapter.

11. The fiber optic end face inspection and cleaning apparatus of claim 10, wherein the pay-off reel and the take-up reel are comprised of gears.

12. The fiber optic end face inspection and cleaning apparatus of claim 11, wherein activation of a button on the housing causes the gears to move the cleaning tape.

13. The fiber optic end face inspection and cleaning apparatus of claim 11, wherein pushing the probe and spindle against the adapter causes the gears to move the cleaning tape.

14. The fiber optic end face inspection and cleaning apparatus of claim 1, wherein the imaging system additionally includes at least one processor and a lens.

15. The fiber optic end face inspection and cleaning apparatus of claim 1, wherein the light source is one of an LED or a laser.

16. The fiber optic end face inspection and cleaning apparatus of claim 1, wherein the tape is formed of multiple layers, including a backing layer and a cleaning layer.

17. A fiber optic end-face inspection and cleaning apparatus, comprising:
   a housing;
   a cleaning system comprising:
      a pay-off reel;
      a take-up reel;
      a spindle; and
      a cleaning tape, wherein the cleaning tape travels off the pay-off reel, around the spindle, and onto the take-up reel; and
   an imaging system comprising:
      a light source; and
      a camera, wherein the camera, the spindle and the tape are in alignment along a direct visual axis; and
   an indicator located on top of the housing, wherein the indicator is configured to alert a user to a status of an end face of a fiber optic connector;
   wherein the pay-off reel, the take-up reel, camera and light source are located within the housing.

18. The fiber optic end face inspection and cleaning apparatus of claim 17, wherein the indicator is one of an alarm, LCD screen, or LED.

19. A fiber optic end-face inspection and cleaning apparatus, comprising:
   a housing;
   a cleaning system comprising:
      a pay-off reel;
      a take-up reel;
      a spindle; and
      a cleaning tape, wherein the cleaning tape travels off the pay-off reel, around the spindle, and onto the take-up reel; and
   an imaging system comprising:
      a light source; and
      a camera, wherein the camera, the spindle and the tape are in alignment along a direct visual axis;
   a probe including a first end and a second end, wherein the first end of the probe includes the spindle and is configured to be insertable into an adapter, and the second end of the probe is attached within the housing; and
   wherein:
      the pay-off reel, the take-up reel, camera and light source are located within the housing;
      the pay-off reel and the take-up reel are comprised of gears; and
      pushing the probe and spindle against the adapter causes the gears to move the cleaning tape.

\* \* \* \* \*